June 6, 1939.  C. R. BIXLER  2,161,007

DOOR LATCH FOR AUTOMOBILES

Filed April 2, 1937

INVENTOR,
Chauncy Roy Bixler

ATTORNEYS.

Patented June 6, 1939

2,161,007

UNITED STATES PATENT OFFICE 2,161,007

DOOR LATCH FOR AUTOMOBILES

Chauncy Roy Bixler, Kansas City, Kans.

Application April 2, 1937, Serial No. 134,571

10 Claims. (Cl. 292—340)

This invention relates to a door latch of a type suitable for use on automobile doors.

Most of the present automobile door latches are provided with two closing positions and much difficulty is experienced in view of the fact that in many instances when the operator closes the door, it engages the first latch, thereby necessitating the opening of the door again and the slamming of the door to cause the same to move to the entirely closed position to engage the second latch.

The inconvenience and annoyance caused by this objectionable feature is overcome by the present invention, in which the principal object is the provision of a latch that has manually controlled means for completely closing the door when the same is in the partially closed position.

Another object of this invention is the provision of a latch for automobile doors, whereby the latch may be manually operated by the driver while in the driving position, to completely close the doors or release the same for opening.

Other objects are simplicity and economy of construction, ease and accuracy of operation, and adaptability to automobiles of different structure.

With these, as well as other objects which will appear during the course of the specification, in view, reference will now be had to the drawing, wherein:

Figs. 1, 2, 3, 4, 5 and 6 are directed to the latch used for securing the front automobile door, which will be considered the preferred embodiment of this invention. Figs. 7 and 8, together with Fig. 1, disclose a latch suitable for the rear door, which is a modification of the invention.

Throughout the several views, like characters designate similar parts, and the numeral 10 indicates an automobile body, having a front door 12 and a rear door 14, so mounted and hinged as to close against the common door post 16.

Figure 2:
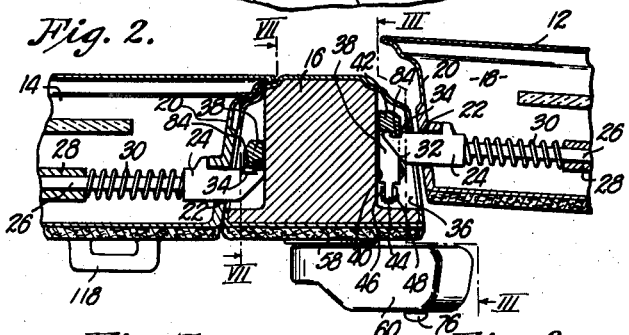
Fig. 2 is an enlarged cross sectional, fragmentary view, taken on line II—II of Fig. 1.

The front door latch 18 will now be described. The end plate 20 of the front door is preferably positioned at a slight angle perpendicular to the plane of the body of the door, and is provided with an opening 22, through which the longitudinally movable bolt 24 is adapted to project. This bolt has a guide stem 26, mounted for reciprocation in block 28, and is provided with a compression spring 30, which is so mounted as to urge the bolt to the outward position, as shown in Fig. 2. The inside portion of the outer end of bolt 24 is beveled as at 32, while the outer face thereof is provided with a vertically disposed groove 34, adjacent its outer end. A recess 36 is formed in door post 16 and is adapted to receive a keeper construction including keeper lever 38, pivoted intermediate its ends at 40 so that the end portion 42 thereof is in the path of travel of bolt 24. The other end 44 of lever 38 is provided with a pin 46, to which an adjustable connection rod 48 is pivoted. The lower end of rod 48 is pivoted by means of pin 50 to lever 52, mounted on horizontally disposed shaft 54, and adjustably secured thereto by set screw 56. Shaft 54 is mounted for rotation in a bearing plate 58, carried by door post 16, and extends outwardly therefrom to receive an arm rest lever 60. By moving the lever 60, it is apparent that the keeper lever 38 may be oscillated about pivot 40.

Figure 4:
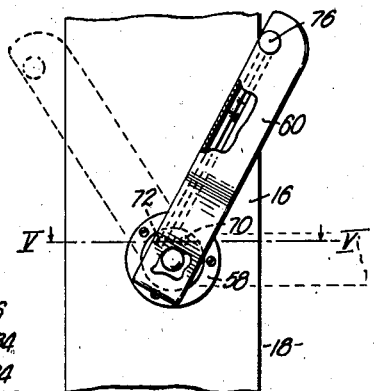
Fig. 4 is an elevation of the door post, with the arm rest lever mounted thereon and shown in two positions.
Figures 3, 7:
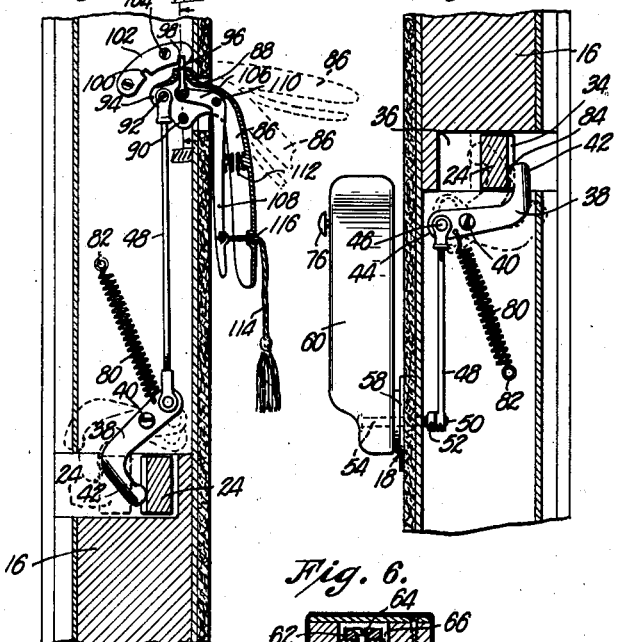
Fig. 3 is a vertical, sectional view, taken on line III—III of Fig. 2.
Fig. 7 is a vertical, sectional view, taken on line VII—VII of Fig. 2.
Figure 6:
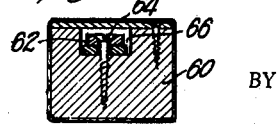
Fig. 6 is an enlarged, cross sectional view, taken on line VI—VI of Fig. 5.
Figure 5:
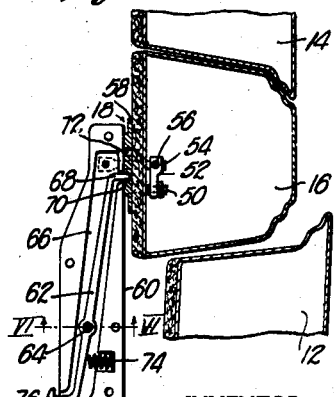
Fig. 5 is a horizontal section, taken on line V—V of Fig. 4, with the arm rest lever in the position attained when the door is completely closed.

In Figs. 2, 3 and 4, the front door 12 is shown in the partially closed position, with the arm rest lever 60 in the condition shown in solid lines of Fig. 4. When the driver desires to completely close the door, he simply forces the lever down to the horizontal position, as shown in Fig. 5.

In order to maintain the parts in proper relative relation, it is necessary to definitely secure the lever 60 in either the intermediate or lower position, and this is accomplished by means of a detent 62, pivoted intermediate its ends at 64 in a recess 66 in lever 60. The inner end 68 is adapted to engage an opening 70, formed in bearing plate 58 when the lever 60 is in the horizontal position, and to engage the opening 72 when the lever 60 is in the intermediate condition. A compression spring 74 tends to move 68 inwardly at all times, however, the button 76 on the end of lever 62 extends outwardly from the lever 60 and provides a means whereby spring 74 may be compressed and the inner end 68 moved to disengage plate 58.

In the normal operation of this latch, when the door is open, the lever 60 is in the position shown in Fig. 4, so as not to interfere with the driver as he takes his place in the front seat. The driver then pulls the door to the partially closed condition by means of handle 78, so that it is situated as indicated in Fig. 2. Then by releasing detent 62 and pressing downwardly on lever 60, the end 42 of keeper lever 38 will move the bolt 24 inwardly to a state to completely close the front door. When this position has been reached, the inner portion 68 of the detent lever 62 will drop in opening 70, thereby locking the front door in the completely closed condition. When it is desired to open the door, the operator presses button 76 to release the detent, then moves the lever 60 through its greatest arc, thereby making it possible to swing the front door to the open position without any interference from the keeper lever 38.

A tension spring 80 is secured at its one end to the inner end of keeper lever 38 and at its other end to a pin 82, rigidly carried by the door post. This spring is adapted to maintain keeper lever 38 in the normal condition, as shown in solid lines in Fig. 3, so that when keeper lever 38 is moved out of the path of bolt 24, the spring will return keeper lever 38 to the normal position, where it will be secured by means of the inner portion of detent 68 entering opening 72. The offset portion 84 of keeper lever 38 will rest in groove 34, formed in bolt 24, thus making it impossible to force bolt 24 longitudinally out of engagement with the keeper lever.

Figure 1:
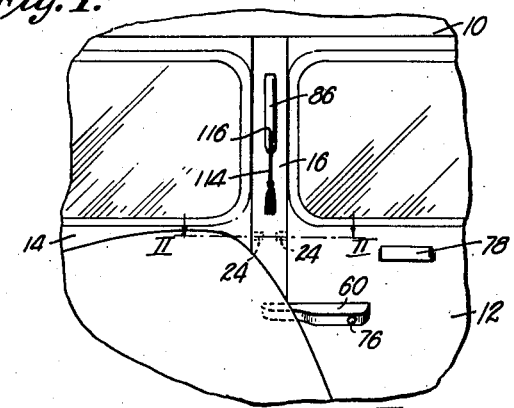
Figure 1 is an inside elevational view of a portion of an automobile, with two door latches shown therein, embodying this invention.
Figure 8:
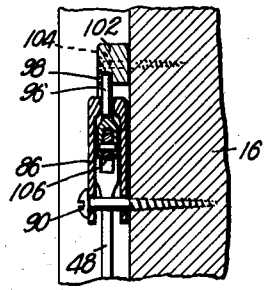
Fig. 8 is an enlarged, sectional view, taken on line VIII—VIII of Fig. 7.

Referring now to Figs. 1, 7 and 8, wherein this invention is applied to the rear door of an automobile, it will be observed that the bolt, keeper lever, and their mountings, are identical with those shown on the front door, with the exception that the rear door mounting is to be operated from above. Operating lever 86 extends through opening 88 formed through the wall of the door post, and is pivoted at 90. The connecting rod 48 is pivoted at 92 to the inner end 94 of lever 86, so that as lever 86 is oscillated, connecting rod 48 will cause keeper lever 38 to be operated.

To maintain keeper lever 38 in the two desired positions, as described above, a lock bolt 96, carried by lever 86, is adapted to be moved into and out of engagement with notches 98 and 100, formed in segment 102. This segment is secured to the door post by means of screws 104. Bolt 96 is pivoted to the inner end 106 of a release lever 108, pivoted at 110 to lever 86. This release lever is urged outwardly from lever 86 by means of a compression spring 112, thereby normally forcing bolt 96 into the notches.

For convenience of releasing bolt 96, a pull cord 114 is secured to the free end of release lever 108 and passed through an opening 116 formed in lever 86, thereby making it possible for the operator to engage said cord and release 96 so that the keeper lever 38 might be moved to the intermediate position. When the keeper lever is in the normal position as just described, and the rear door is in the open state, it may be moved to the partially closed condition by the occupant engaging handle 118. It is apparent that when this operation takes place the bolt 24 will simply slide inwardly a sufficient distance to allow the keeper to move past end portion 42 of strike lever 38. With the door controls at the side of the car adjacent the driver's seat, he may easily regulate the operation of the doors without any inconvenience. Furthermore, with this structure, it is unnecessary to have outside latch releases for the doors, thereby adding to the safety of the occupants and eliminating costly equipment.

What I claim is:

1. In a latch for an automobile including a door and a door post, a keeper bolt carried for reciprocation by said door; a keeper lever carried by said door post adapted to engage said keeper bolt and draw the bolt and door to the completely closed position; and manually controlled means associated with said keeper lever whereby the same is operated to cause said door to be moved from a partially closed position to a completely closed position.

2. In a latch for an automobile including a door and a door post, a bolt carried for reciprocation by said door; a pivoted keeper lever carried by said door post and adapted to engage said bolt and draw the bolt and door to the completely closed position; and manually controlled means for operating said keeper lever to move said door from a partially closed position to a completely closed position.

3. In a latch for an automobile including a door and a door post, a bolt carried by said door; a pivoted keeper lever carried by said door post and adapted to engage said bolt and draw the bolt and door to the completely closed position; manually controlled means for operating said keeper lever to move said door from a partially closed position to a completely closed position, said manually controlled means being adapted to be positioned to hold said keeper lever out of the path of travel of said bolt.

4. In a latch for an automobile including a door and a door post, a yieldable bolt carried by said door; a pivoted keeper lever carried by said door post and adapted to engage said bolt and draw the bolt and door to the completely closed position to secure the door closed; a lever manually operable to move said keeper lever and means to secure said keeper lever in an intermediate position to cause said keeper lever to hold the door in a partially closed position, said means being manually releasable to permit said levers to be manually operated to move said door from the partially closed position to the completely closed position.

5. In a latch for an automobile including a door and a door post, a yieldable bolt carried by said door; a pivoted keeper lever carried by said door post and adapted to engage said bolt and to draw the bolt and door to the completely closed position and to secure the door closed; and means to secure said keeper lever in an intermediate position to hold the door in a partially closed position, said means being manually releasable from said secured position to permit said lever to be manually operated to move the door from the partially closed to the completely closed position and to secure the door in the completely closed position.

6. In a latch for an automobile including a door and a door post, a yieldable bolt carried by said door; a pivoted keeper lever carried by said door post and adapted to engage said bolt and draw the bolt and door to the completely closed position and to secure the door closed; and means including an operating lever within the automobile to move said keeper lever and secure it in a plurality of different positions, whereby the door is secured in a partially closed or completely closed position.

7. In a latch for an automobile including a door and a door post, a yieldable bolt carried by said door; a pivoted keeper lever carried by said door post and adapted to engage said bolt and draw the bolt and door to the completely closed position and to secure the door closed; and means including an operating lever within the automobile to move said keeper lever and secure it in a plurality of different positions, whereby the door is secured in a partially closed or completely closed position, and resilient means to move said keeper lever to an intermediate position.

8. In a latch for an automobile including a door and a door post, a bolt carried by said door and having a vertically disposed groove in the inner face thereof; a pivoted keeper lever carried by said door post and adapted to engage said bolt and rest in said groove and draw said bolt and door to the completely closed position; and manually controlled means for operating said keeper lever to move said door from a partially closed position to a completely closed position.

9. In a latch for an automobile including a door and a door post, a yieldable bolt carried by said door; a pivoted keeper lever carried by said door post with an end portion thereof in the path of travel of said bolt and adapted to engage said bolt and draw the bolt and door to the completely closed position; a pivoted operating lever carried by said door post and operatively interconnected with said keeper lever by means of a longitudinally adjustable connecting rod; a movable bolt carried by said operating lever; and a notched segment carried by said door post and adapted to receive said bolt to secure said operating lever in a selected position whereby said door is secured in a predetermined position by said bolt and said interconnecting parts.

10. In a latch for an automobile including a door and a door post, a yieldable bolt carried by said door; a pivoted keeper lever carried by said door post with an end portion thereof in the path of travel of said bolt and adapted to engage said bolt and draw the bolt and door to the completely closed position; a pivoted operating lever carried by said door post and operatively interconnected with said keeper lever by means of a longitudinally adjustable connecting rod; a movable bolt carried by said operating lever; a notched plate carried by said door post and adapted to receive said bolt to secure said operating lever in a selected position whereby said door is secured in a predetermined position by said bolt and said interconnecting parts; and resilient means to move said operating lever through a part of its travel.

CHAUNCY ROY BIXLER.